US006258200B1

(12) United States Patent
Kassab

(10) Patent No.: US 6,258,200 B1
(45) Date of Patent: Jul. 10, 2001

(54) STATIC-CLING INTERMEDIARY

(75) Inventor: Peter K. Kassab, Chicago, IL (US)

(73) Assignee: Lemeer Design, L.L.C., Chicago, IL (US)

( * ) Notice: Subject to any disclaimer, the term of this patent is extended or adjusted under 35 U.S.C. 154(b) by 0 days.

(21) Appl. No.: 09/283,345

(22) Filed: Mar. 31, 1999

Related U.S. Application Data

(63) Continuation-in-part of application No. 08/882,670, filed on Jun. 25, 1997, now abandoned.

(51) Int. Cl.[7] .............................. B32B 3/06; B32B 31/04; G09F 3/20; G09F 19/00

(52) U.S. Cl. ........................... 156/273.1; 40/593; 40/594; 40/611; 156/267; 156/277; 156/291; 428/42.1; 428/203; 428/354

(58) Field of Search ................................ 156/273.1, 267, 156/277, 71, 290, 291, 292; 40/591, 593, 594, 611; 428/42.1, 354, 203

(56) References Cited

U.S. PATENT DOCUMENTS

| | | |
|---|---|---|
| H46 | 4/1986 | Gladden . |
| 3,533,178 | 10/1970 | Strohmaier . |
| 3,967,022 | 6/1976 | Hasei . |
| 4,184,276 | 1/1980 | Hernandez . |
| 4,225,369 | 9/1980 | Felchlin . |
| 4,528,232 | 7/1985 | Cliffe . |
| 4,536,423 | 8/1985 | Travis . |
| 4,992,121 | 2/1991 | Rubino . |
| 5,102,171 | 4/1992 | Saetre . |
| 5,207,011 | 5/1993 | Coulthard . |
| 5,258,214 | 11/1993 | Cooledge et al. . |
| 5,334,431 | 8/1994 | Longtin . |
| 5,403,025 | 4/1995 | Shanley . |
| 5,502,912 | 4/1996 | LeBoff et al. . |
| 5,609,938 | 3/1997 | Shields . |

FOREIGN PATENT DOCUMENTS

| | | |
|---|---|---|
| 2364518 | 5/1978 | (FR) . |
| 698584 | 10/1953 | (GB) . |
| 730524 | 5/1955 | (GB) . |
| 2217256 | * 10/1989 | (GB) . |
| 2231551 | 11/1990 | (GB) . |
| 59-111183 | 6/1984 | (JP) . |

* cited by examiner

*Primary Examiner*—Steven D. Maki
(74) *Attorney, Agent, or Firm*—Wallenstein & Wagner, Ltd.

(57) ABSTRACT

A sticker assembly is disclosed and includes an indicia-bearing sticker (30) having an adhesive layer (34). A static-cling film (20) is provided having a first side (22) and a second side (24), the second side (24) holding a static charge. The first side (22) of the static-cling film (20) is adhered to the adhesive layer (34) of the sticker (30). The second side (24) of the static-cling film (20) is applied to a receiving surface (12) and held against the surface (12) by the static charge wherein the static-cling film (20) and the sticker (30) are releasably adhered to the receiving surface (12) and wherein the indicia-bearing sticker (30) is displayed for viewing. In one embodiment, the sticker (30) is a vehicle windshield sticker and the receiving surface (12) is a vehicle windshield. The static-cling film (20) is an intermediate layer between the windshield sticker (30) and the windshield (12) allowing the sticker (30) to be easily peeled off when replacing the sticker (30) or transferring the sticker (30) to another vehicle. The sticker (30) is not damaged when peeled off and the windshield (12) remains free of adhesive residue.

6 Claims, 4 Drawing Sheets

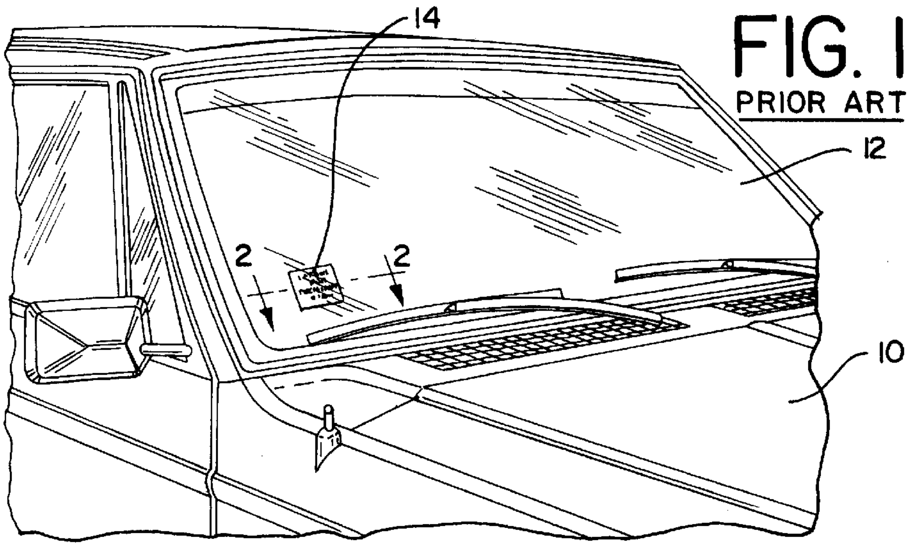
FIG. 1
PRIOR ART
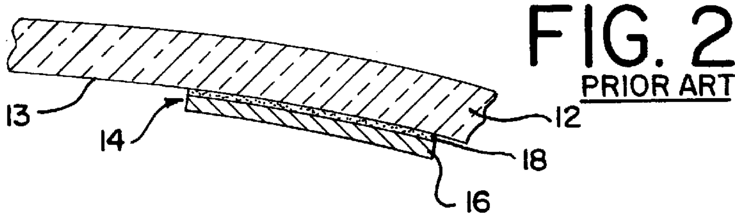
FIG. 2
PRIOR ART
FIG. 3
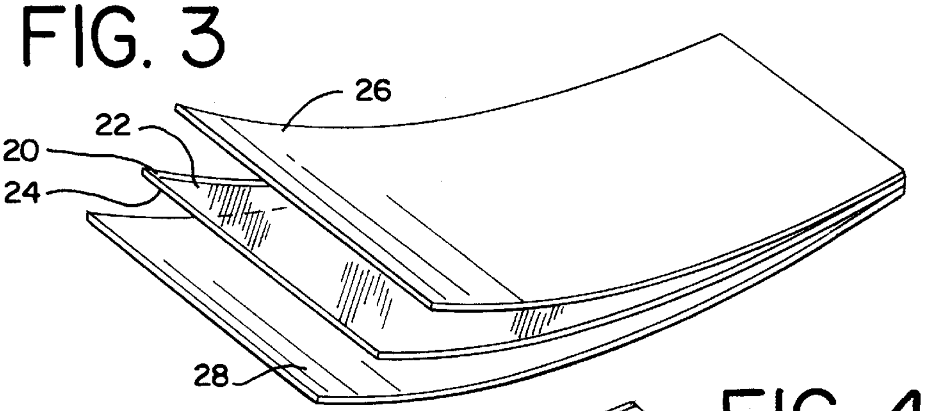
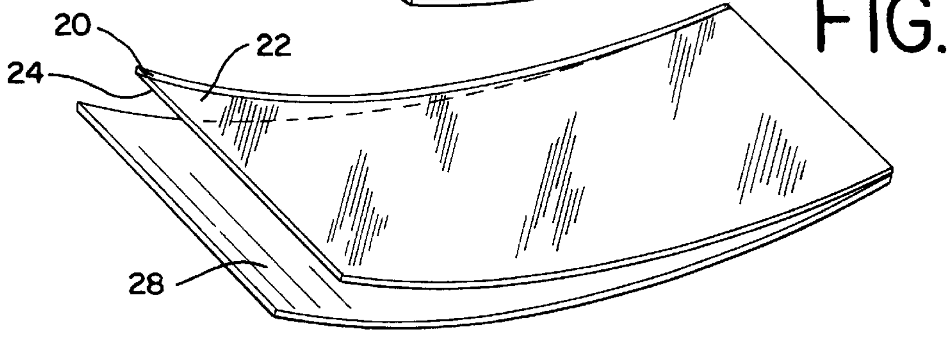
FIG. 4

STATIC-CLING INTERMEDIARY

RELATED APPLICATION

The present application is a continuation-in-part application of U.S. patent application Ser. No. 08/882,670, filed on Jun. 25, 1997, now abandoned, which is expressly incorporated herein by reference.

TECHNICAL FIELD

This invention relates generally to a static-cling film utilized as an intermediary and more particularly to a static-cling film used as an intermediate layer between a car windshield and a car windshield sticker.

BACKGROUND OF THE INVENTION

There are many applications where indicia-bearing stickers are placed on receiving surfaces for display. Oftentimes, the stickers include a strong adhesive wherein the sticker is, more or less, permanently bonded to the receiving surface.

For example, vehicle window stickers are often required to be applied to car windows such as a car windshield. These vehicle window stickers include park registration stickers, parking lot stickers and vehicle registration stickers. Many cities require residents to register their vehicles and apply the vehicle registration sticker to the windshield, sometimes referred to as a "city sticker." Other types of vehicle window stickers include stickers displaying emissions data and insurance data, stickers displaying support for local police departments and stickers displaying affiliation with a university.

These vehicle windshield stickers have indicia-bearing print thereon and a layer of adhesive over the indicia. The stickers are adhered to the inside of the vehicle windshield so they can be viewed from the outside of the vehicle through the glass or plastic windshield. The adhesive typically used on windshield stickers forms a strong bond with the window glass. Consequently, once the sticker is adhered to the windshield, it is extremely difficult to remove the sticker.

In certain instances, it is desirable to remove the sticker from the windshield. For example, park registration stickers and city stickers normally expire annually, and a new sticker must be purchased and applied to the windshield. Many car owners prefer to remove the expired city sticker before replacing it with the current year's city sticker. The strong adhesive used on the city stickers makes it almost impossible to remove the sticker without either mutilating or destroying the sticker. Consequently, simply trying to peel the sticker off of the windshield breaks the sticker into small pieces. One may use a razor blade to shave the sticker from the windshield. However, this usually causes a bending or possible breaking of the razor blade causing possible injury to one's fingers. In addition, the razor blade frays the sticker into small shavings that fall onto the dashboard and car floor making for difficult clean-up. Furthermore, if the sticker is placed at a lowermost position on the windshield, access by one's fingers to the sticker is limited because of the angle between the windshield and dashboard.

Invariably, even when using a razor blade, some of the sticker adhesive remains on the windshield. One must then use a solvent to clean the remaining adhesive from the windshield.

In certain instances, it is desirable to remove a windshield sticker from one vehicle and transfer it to another vehicle. For example, one who owns multiple cars may transfer a parking garage sticker from one car to another car. Windshield stickers may also need to be transferred when a car is sold. The strong adhesive used on the stickers makes this removal almost impossible without mutilating or destroying the stickers.

In all, the process of removing city stickers and other vehicle windshield stickers from windshields is sloppy, very time consuming and frustrating to vehicle owners.

U.S. Pat. Nos. 5,502,912; 4,184,276; and 3,533,178 disclose brackets that hold a city sticker or other windshield sticker. The brackets are mounted to the inside of a car windshield. These devices, however, only hold one sticker and are considered unsightly.

U.S. Pat. No. 5,207,011 to Coulthard discloses a display apparatus incorporating a mat panel with numerous apertures and display strips. As shown in FIG. 3, a display strip 30 is formed from the combination of the backing strip 44, photonegative strip 40, and double face adhesive tape 50. As disclosed, the backing strip 44 is formed of translucent static-cling material. (Col. 3, lns. 33–35, 46). Translucent material allows light to pass through but diffuses the light such that objects on the opposite side are not clearly visible. The photonegative strip 40 incorporates a top layer of translucent indicia, (Col. 2, lns. 21–25), and substantially opaque material about the translucent indicia. (Col. 4, lns. 43–45). More specifically, the photonegative strip 40 has a central portion 34 with translucent indicia and an outer peripheral portion 32 that is substantially opaque. (Col. 3, lns. 19–22, 30–32). As shown in FIGS. 4 & 5, the display strip 30 is attached to a receiving surface in the form of a translucent display panel 12. (Col. 2, lns. 66–68). The outer surface of the display panel 12 is an opaque mat panel 20. (Col. 3 lns. 2–4). When the display strip 30 is attached to the display panel 12, the indicia must be viewed from a position in front of the display panel (See FIGS. 1–4).

Thus, in Coulthard, the indicia-bearing surface on the display strip 30 is not viewable through the receiving surface, or display panel 12. Coulthard does not disclose any application or installation where the indicia can be viewed through the receiving surface or display panel 12. Instead, Coulthard discloses a device where the indicia is viewed from in front of the display panel 12. As disclosed, it would be impossible to view the indicia through the receiving surface because the mat panel, a layer of the display panel, is opaque.

U.S. Pat. No. 5,609,938 to Shields discloses a one way vision display panel, which is an assembly of panels arranged to allow viewing of an image when looking in one direction but the panels are arranged to prevent the viewing of the image when looking in the opposite direction. (Col. 1, lns. 19–23). The display panel assembly 10 includes a first panel 12, a second panel 14, and a third panel 16. (Col. 6, lns. 37–38). The three panels, 12, 14 and 16, are bound together by adhesive layers, 18 and 20. (Col. 6, lns. 46–48). Each of the three panels, 12, 14, and 16, and the adhesive layers, 18 and 20, are perforated with a plurality of holes. (Col. 7, lns. 10–12). As shown in FIG. 2, holes 26 are provided in panel 16, holes 28 are provided in panel 14, and holes 30 are provided in panel 12. (Col. 7, lns. 12–14). The three panels, 12, 14, and 16 are aligned with each other to form continuous light passages through the formed display panel assembly 10. (Col. 7, lns. 15–18). The purpose of the holes, 28, 30, and 32 is to permit the transmission of light through the panels without significant reflection. (Col. 8, lns. 6–8). In general, "the holes allow viewing through the panel assembly in one direction without seeing the image, yet the image can be viewed by looking at the panel assembly from the opposite direction." (Col. 3, Ins. 30–34). Thus, the holes are an integral feature of the invention in Shields.

U.S. Pat. No. 3,967,022 to Hasei discloses an adhesive label laminate sheet, where the laminate consists of paper 3, vinylchloride film 5, an adhesive agent 4, and a releasing agent. (Col. 1, Ins. 31–58). The vinylchloride film 5 is coated with a releasing agent such that if the paper 3 is separated from the vinylchloride film 5, the adhesive agent 4 will be transferred on to the paper 3, consequently obtaining an adhesive label 8 of paper 3 coated with an adhesive agent 4. (Col. 1, Ins. 46–53). After removal of the adhesive agent 4 from the vinylchloride film 5, the adhesive label 8 can be re-applied to another object by means of the transferred adhesive agent 4. (Col. 1, Ins. 56–59).

Like vehicle windshield stickers, trying to remove conventional stickers adhered directly onto a receiving surface is also frustrating. When trying to peel the sticker from the surface, the sticker often tears into small pieces. In addition, adhesive residue often remains on the receiving surface requiring additional cleaning.

The present invention is provided to solve these and other problems.

SUMMARY OF THE INVENTION

The present invention utilizes a static-cling film as an intermediary between a sticker having an adhesive layer, such as a car windshield sticker, and a receiving surface, such as a car windshield. Static-cling films, typically made from plastic, are known and have been used as window stickers. In one application, emblems, logos or advertisements are printed on static-cling film. The film is then place on a receiving surface such as a car window for aesthetic purposes. Through an electrostatic charge held on one side of the film, the film adheres to the glass window. In another application, vehicle oil-change businesses use static-cling stickers on customers' windshields. Mileage and dates are listed on the sticker to inform the customer when the next oil change is due. Such static-cling stickers are shown, for example, in U.S. Pat. Nos. 5,403,025 and 5,334,431. The static-cling stickers adhere to the glass windows and can be easily peeled-off when desired. None of these patents, however, disclose or suggest the use of a static-cling film as an intermediary as described below.

According to a first aspect of the invention, a sticker assembly is disclosed. A sticker having an indicia-bearing surface and a static-cling film are provided. An adhesive is disposed between the sticker and the film and connects the sticker to the static-cling film. The indicia-bearing surface is viewable and the sticker assembly is adapted to be releasably adhered to a receiving surface.

According to another aspect of the invention, a method of releasably adhering an indicia-bearing substrate to a receiving surface is disclosed. A static-cling film having a first side and a second side, the second side holding a static charge is provided. The substrate is adhered to the first side of the static-cling film with a layer of adhesive to form a static-cling sticker assembly. The adhesive layer can be integral with the substrate as in the form of sticker or applied separately. The static-cling assembly is then adhered to the receiving surface by placing the second side of the static-cling film against the receiving surface wherein the indicia on the substrate is displayed for viewing.

According to another aspect of the invention, a method of releasably adhering a car windshield sticker to a car windshield is disclosed. An indicia-bearing car windshield sticker is provided that has an adhesive layer thereon. A static-cling film is provided having a first side and a second side, the second side holding a static charge. The sticker is adhered to the first side of the static-cling film via the adhesive layer to form a static-cling sticker assembly. The static-cling sticker assembly is then releasably adhered to an inside surface of the car windshield by placing the second side of the static-cling film against the windshield wherein the static charge holds the assembly against the windshield. The indicia is viewable from outside of the car windshield. A windshield sticker assembly is thus formed wherein the static-cling film serves as an intermediate layer between the windshield sticker and the windshield. The static-cling sticker assembly can be easily peeled off of the windshield when desired.

According to a further aspect of the invention, the static-cling film is trimmed wherein its peripheral edges are in registry with peripheral edges of the windshield sticker.

According to another aspect of the invention, the sticker is a conventional sticker having an indicia-bearing surface on one side and an adhesive layer on an opposite side. A receiving surface is provided that can be in the form of household appliances or windows. The static-cling film is adhered to the adhesive layer of the sticker to form a static-cling sticker assembly. The static-cling sticker assembly is then releasably adhered to the receiving surface such as a household refrigerator wherein the indicia is displayed for viewing. The sticker assembly can be easily peeled off of the receiving surface when desired. The receiving surface is not damaged by having a the adhesive layer of the sticker directly contacting the receiving surface.

Other features and advantages of the invention will be apparent from the following specification taken in conjunction with the following drawings.

BRIEF DESCRIPTION OF THE DRAWINGS

FIG. 1 is a partial perspective view of a vehicle having a conventional windshield sticker adhered to its windshield;

FIG. 2 is a partial cross-sectional view, taken along Lines 2—2 of FIG. 1;

FIG. 3 is a perspective view of a static-cling film having layers of protective paper on each side of the film;

FIG. 4 is a perspective view showing the static-cling film of FIG. 3 having one of the protective paper layers removed;

DETAILED DESCRIPTION OF THE PREFERRED EMBODIMENT

Figure 5:
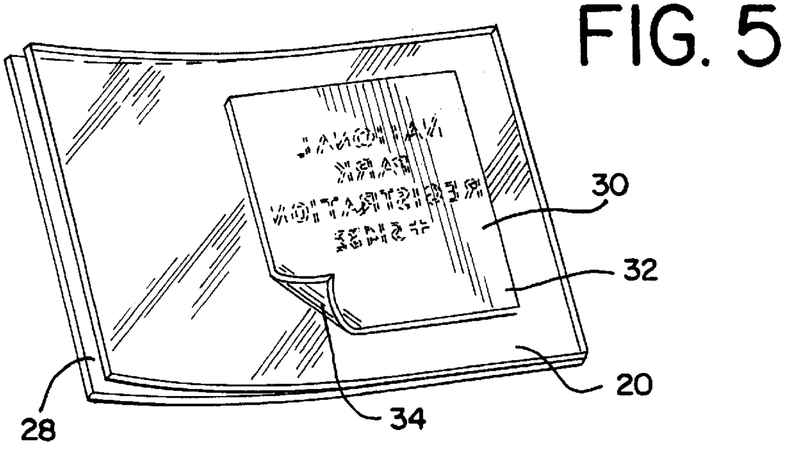
FIG. 5 is a perspective view showing the static-cling film of FIG. 4 with a windshield sticker having an adhesive layer being adhered to the static-cling film to form a static-cling sticker assembly.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIG. 1 shows a partial view of a vehicle 10, having a windshield 12. Although a car is shown in FIG. 1, the present invention applies to any number of vehicles having windshields and windows. The car 10 has a conventional car windshield sticker 14 adhered to an inside surface 13 (FIG. 2) of the windshield 12. The car windshield sticker 12 in FIG. 1 could be a park registration sticker or vehicle registration sticker. The present invention, nevertheless, applies to any type of car window sticker that is designed to be adhered to the car windshield 12 or other car windows by an adhesive layer on the sticker 14. It will be understood that the term "windshield" encompasses any car window or other receiving surface.

FIG. 2 shows a partial cross-sectional view of the conventional windshield sticker 14. The sticker 14 includes an indicia-bearing substrate 16 and an adhesive layer 18. The indicia that the substrate 16 bears is typically registration information such as a park name and identification number or other relevant information. The indicia on the substrate 16 is designed to be viewed from outside of the car 10 through the windshield 12. The adhesive layer 18 is transparent and is applied over the substrate 16. The sticker 14 also includes a protective paper layer (not shown) over the adhesive layer 18. The paper layer is designed to be is peeled off and the adhesive layer 18 is placed in direct contact with an inside surface 13 of the windshield 12 to mount the sticker 14.

In the present invention, a layer of static cling film is used as an intermediary between the windshield sticker 14 and the windshield 12. FIG. 3 shows a static-cling film 20 that is transparent. It is important for the film 20 to be transparent for the indicia on the sticker to be seen through the windshield 12. The static-cling film 20 has a first side 22 and a second side 24. The second side 24 is charged with an electrostatic charge for adhering to a receiving surface. The film 20 can be vinyl film that can adhere to surfaces through electrostatic properties of the film. The static-cling film 20 also has a first protective paper layer 26 adjacent the first side 22 and a second protective paper layer 28 adjacent the second side 24.

Figure 6:
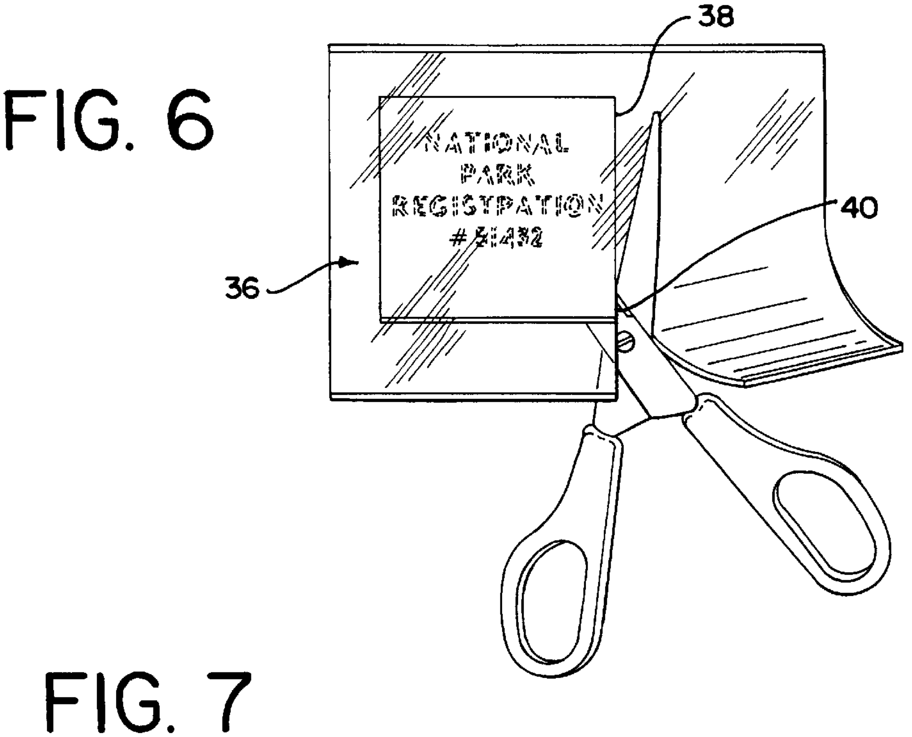
FIG. 6 is a plan view showing the trimming of the static-cling sticker assembly wherein its peripheral edges are in registry with peripheral edges of the windshield sticker.
Figure 7:
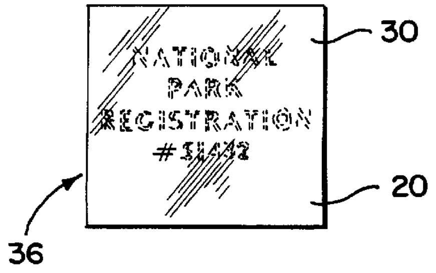
FIG. 7 is a front elevational view of the static-cling sticker assembly.

FIGS. 3–8 illustrate the method of the present invention for releasably adhering an indicia-bearing substrate to a receiving surface, such as a car windshield. The static-cling film 20, with is protective paper layers 26,28 (FIG. 3) and a car windshield sticker 30 (FIG. 5) are first provided. As shown in FIGS. 5–7, the windshield sticker 30 bears park registration information. As discussed, the sticker 30 could be any number of different stickers designed to be adhered to a car window by an adhesive layer. As shown in FIG. 5, the sticker 30 has an indicia-bearing substrate 32 with an adhesive layer 34 applied over the substrate 32. In this type of sticker, the adhesive is applied over the indicia.

As shown in FIG. 4, the first protective paper layer 26 is removed to expose the first side 22 of the static-cling film 20. A protective paper layer (not shown) provided with the windshield sticker 30 is also removed to expose the adhesive layer 34. The film 20 is a continuous, uninterrupted layer and is unperforated having no holes. Holes or perforations are undesirable because it would allow the adhesive to contact the windshield. As shown in FIG. 5, the sticker 30 is adhered to the first side 22 of the static-cling film 20. This fixedly attaches the sticker 30 or substrate to the film 20. The film 20 used does not utilize a releasing agent that would allow the film to be separated from the sticker. Once the sticker is adhered, it remains adhered. Attempts could be made to separate the film and sticker but it would be undesirable to do so. Furthermore, attempts to separate would likely destroy the film and the sticker. It is understood that the adhesive used in typical windshield stickers is very strong and along with a film without a suitable releasing agent, the sticker and film cannot be separated once adhered to one another. Obviously, one could attempt to apply a solvent or scrape the film off but this would likely destroy the film and sticker. In such case, one would simply form a new assembly. As shown in FIGS. 6 and 7, once adhered, a static-cling sticker assembly 36 is formed and comprises the static-cling film 20 and the windshield sticker 30. The static-cling sticker assembly 36 is a layered structure.

As shown in FIG. 6, the static-cling film 20 has a larger surface area than the windshield sticker 30. The portions of the static-cling film 20 that extend beyond the windshield sticker 30 are trimmed to conform to the size of the windshield sticker 30. Peripheral edges 38 of the sticker 30 are then in registry with peripheral edges 40 of the film 20 (FIG. 7). For clarity, FIGS. 6 and 7 are shown with the second protective paper layer 28 removed. To prevent soiling of the second side 24 of the static-cling film 20 capable of holding the electrostatic charge, however, the second protective paper layer 28 is preferably retained on the film 20 while the film 20 is trimmed. The second protective paper layer 28 is not removed until the static-cling sticker assembly 36 is ready to be adhered to a receiving surface. This helps to prevent dirt or other particles from contaminating the second side 24 of the film 20 holding the static charge. Because the film 20 is transparent, it will be virtually undetected when the static-cling sticker assembly 36 is adhered to the car windshield 12. As shown in FIG. 7, the second protective paper layer 28 is then removed to expose the second side 24 of the static-cling film 20. The indicia-bearing sticker 30 is seen through the transparent static-cling film 20.

Figure 8:
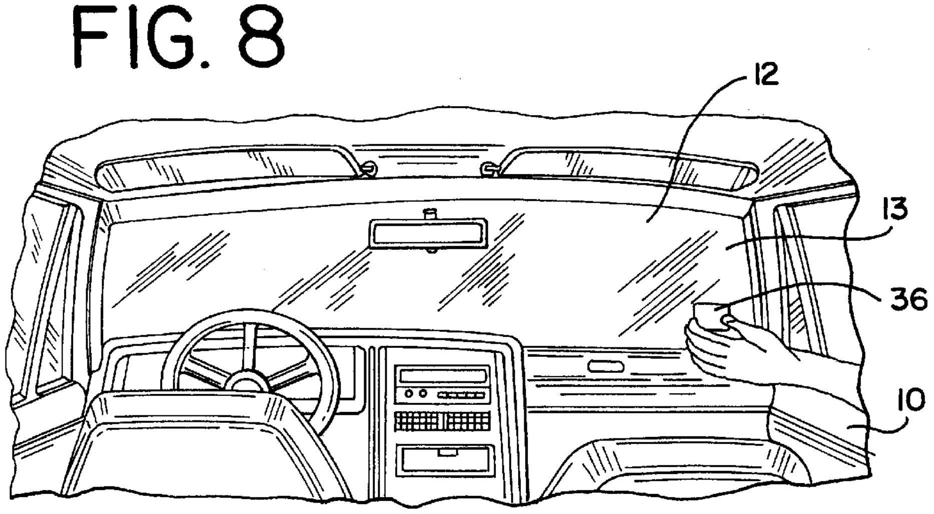
FIG. 8 is a partial perspective view showing the static-cling sticker assembly being adhered to the inside of a vehicle windshield.
Figure 9:
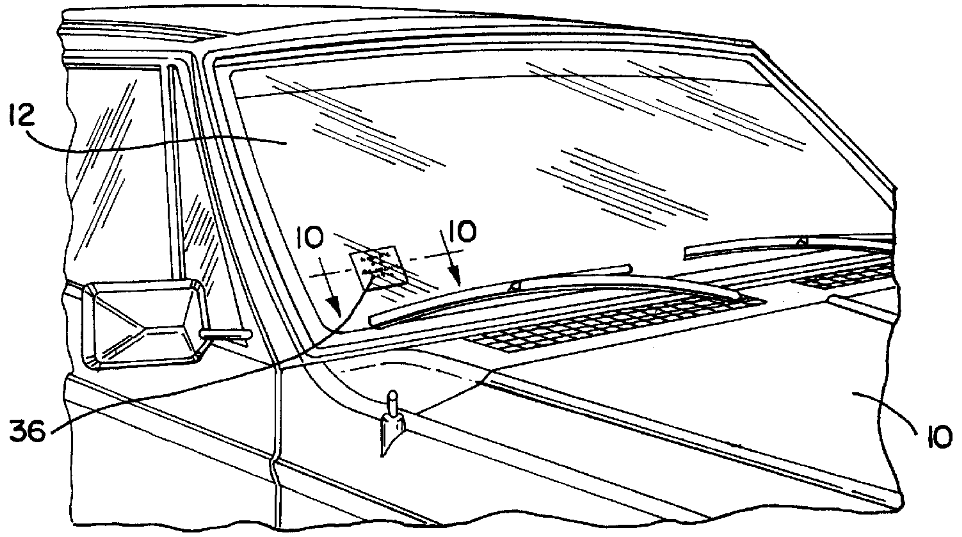
FIG. 9 is a partial perspective view showing the static-cling sticker assembly adhered to the windshield as viewed from outside of the vehicle.

As shown in FIG. 8, the static-cling sticker assembly 36 is then adhered to the car windshield 12. Specifically, the second surface 24 of the static-cling film 20 is placed against the inside surface 13 of the windshield 12. The assembly 36 "clings" to the windshield 12 via the static charge associated with the second side 24 of the static-cling film 20; the properties of the film allow for the static charge to develop between the film 20 and the windshield 12 to hold the assembly against the windshield 12. As shown in FIG. 9, the indicia-bearing sticker 30 is readily seen through the windshield 12 from outside of the vehicle 10. As previously stated, the transparency of the film 20 makes it virtually undetectable. With such configuration, the car windshield sticker 30 is releasably adhered to the car windshield 12 without the adhesive layer 34 coming into direct contact with the windshield 12. The sticker 30 can then be easily removed when desired and re-adhered to the windshield 12 if desired. The windshield 12 also remains clean from adhesive residue associated with the sticker 30.

Figure 10:
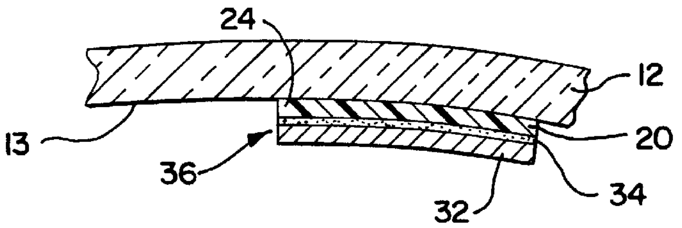
FIG. 10 is a partial cross-sectional view, taken along Lines 7—7 of FIG. 9, showing the static-cling sticker assembly adhered to the windshield.

FIG. 10 shows a partial cross sectional view of the static-cling sticker assembly 36 releasably adhered to the windshield 12. The static-cling sticker assembly 36 is a layered structure that comprises the sticker 30 and the static-cling film 20. The windshield sticker 30 includes the indicia-bearing substrate 32 and the adhesive layer 34. The adhesive layer 34 adheres the sticker 30 to the first side 22 of the static-cling film 20. The static-cling film 20 is releasably adhered to the inside surface 13 of the windshield 12. The indicia-bearing substrate can thus be viewed through the windshield 12 as the static-cling film 20 and adhesive layer 34 are transparent.

Figure 15:
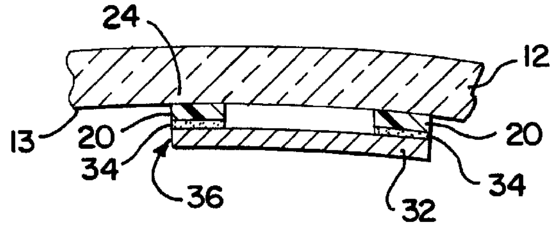
FIG. 15 is another embodiment of a static-cling sticker assembly of the present invention.

Another embodiment of the present invention is designed for use with "temporary city stickers" made from paper (FIG. 15). The adhesive layer on these temporary stickers typically comprises a thin line of adhesive along the sides of the sticker rather than a complete adhesive layer across the entire face of the sticker. The indicia-bearing portion of the sticker does not have adhesive over that portion. The present invention can also be used with such temporary stickers. Rather than a single piece of static-cling film 20 that covers the entire sticker, the static-cling film 20 now comprises two strips of film that correspond to the lines of adhesive on the sticker. The strips of film are positioned to correspond to the position of the adhesive strips. The strips can also be trimmed to correspond in size to the strips of adhesive. After the strips of film are adhered to the lines of adhesive, the temporary sticker is releasably adhered to the windshield 12 as shown in FIGS. 8–10. This type of sticker assembly is shown in FIG. 15.

FIGS. 3–8 show the static-cling film 20 larger than the windshield sticker 30. It is understood that the static-cling film 20 can be used in a number of different sizes depending on the size of the sticker 30. In addition, the static-cling film 20 should preferably be transparent in order to view the indicia through the windshield 12. Different levels of transparency, however, are possible. For example, while the film 20 is preferably clear, it could also be slightly tinted if desired.

Also, as previously discussed, the present invention can be used for all types of stickers designed to be adhered to vehicle windows. Besides park registration stickers, the static-cling film 20 intermediary can be used with city stickers, parking lot stickers, stickers supporting local police departments, car alarm stickers and stickers showing college affiliation and others. While many stickers are placed on the car windshield, the stickers can also be applied with the static-cling intermediary to other car windows. In addition, the stickers could be placed on an outside surface of a car window although an inside surface is preferred to protect the sticker from adverse weather conditions. Finally, the receiving surface 12, while normally a vehicle window, can be any surface that the static-cling film 20 can releasably adhere to.

Many advantages are realized by employing the static-cling film 20 of the present invention. A primary advantage is the ability to easily peel-off the static-cling sticker assembly 36, and thus the windshield sticker 30, from the windshield 12. Many vehicle owners may apply numerous city stickers 30 on the windshield 12 over the years without removing the expired sticker 30. This accumulation of stickers 30 can become unsightly. In addition, having too many city stickers 30 mounted on the windshield creates blind spots thereby reducing a driver's vision through the windshield 12. Many other vehicle owners, however, prefer to minimize the number of windshield stickers 30 applied to the windshield 12. These vehicle owners remove the expired city sticker 30, for example, before replacing it with the current year's city sticker 30. By using the static-cling film 20 as an intermediate layer between the windshield 12 and the sticker 30, the sticker 30 is easily peeled-off and replaced. The windshield 12 remains free of adhesive residue from the sticker 30. Also, by using the static-cling film 20 as an intermediary, certain windshield stickers 30, such as parking lot stickers, can be easily transferred from one vehicle to another. The static-cling film 20 can also be adhered to the windshield sticker 30 and then to the windshield 12 very quickly and efficiently, and without wrinkles or creases. Finally, by using the static-cling film 20, one can readily adjust the position of the window sticker so that it is perfectly straight in the lowermost corner of the windshield 12. The strong adhesive used with conventional window stickers only allows for one chance in mounting the sticker to the windshield 12. Adjusting the conventional window sticker once adhered to the window is almost impossible.

Figure 11:
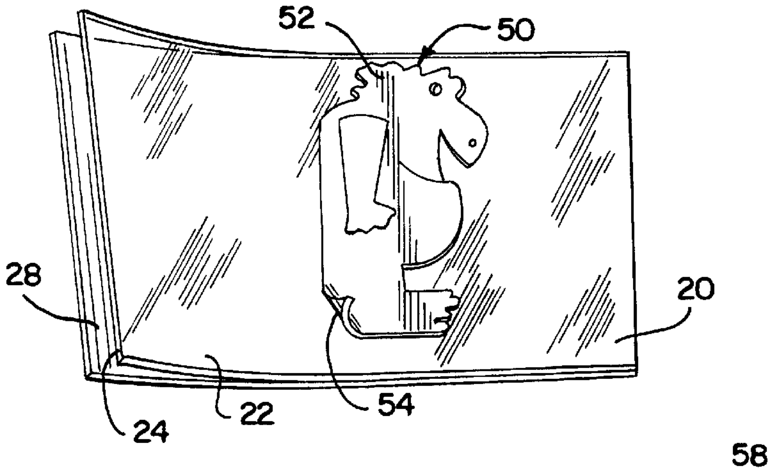
FIG. 11 is a perspective view of another embodiment of the invention showing a sticker having an adhesive layer being adhered to a static-cling film to form a static-cling sticker assembly.

FIGS. 11–14 illustrate another embodiment of a method and assembly for releasably adhering an indicia-bearing substrate to a receiving surface. The static cling film 20 shown in FIG. 3 is also used in this embodiment. The substrate is a conventional sticker 50 having an indicia-bearing surface 52 and an adhesive layer 54. While in the windshield sticker 30, the adhesive layer 34 is applied over the indicia-bearing surface 32, the sticker 50 has the indicia-bearing surface 52 on one side and the adhesive layer 54 on an opposite side of the sticker 50. The sticker 50 shown in FIG. 11 is one marketed towards children, for example, although any type of conventional sticker could be used.

Figure 12:
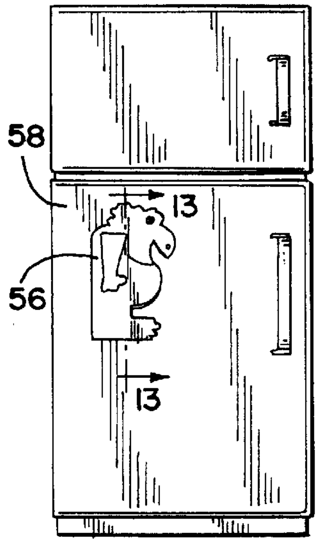
FIG. 12 is a front elevational view showing the static-cling sticker assembly of FIG. 11, with the other protective paper layer removed, adhered to a household appliance.

As shown in FIG. 11, the static-cling film 20 is provided and has the first protective paper layer 26 removed. The protective paper layer covering the adhesive layer 54 on the sticker 50 (not shown) is also removed. The sticker 50 is then adhered to the first side 22 of the static-cling film via the adhesive layer 54. While the adhesive layer 54 is integral with the sticker 50, it is understood that one could apply the adhesive layer 54 to the indicia-bearing surface as a separate step. A static-cling sticker assembly 56 is thus formed from the sticker 50 and the static-cling film 20. If desired, the static-cling film could be trimmed to place the peripheral edges of the film 20 in register with the peripheral edges of the sticker 50 (FIG. 12).

Figure 13:
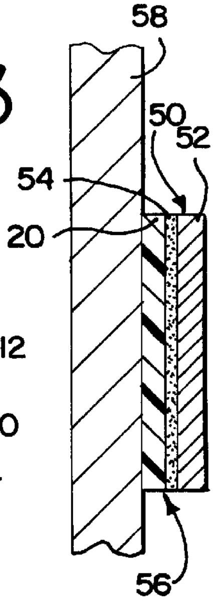
FIG. 13 is a partial cross-sectional view, taken along Lines 13—13 in FIG. 12, of the static-cling sticker assembly adhered to the household appliance; and, FIG. 14 is a front elevational view showing a static-cling sticker assembly adhered to a household window.

The static-cling sticker assembly 56 is now ready to be releasably adhered to a receiving surface. FIG. 12 shows a receiving surface 58 in the form of a household refrigerator. The static-cling sticker assembly 56 is then releasably adhered to the household refrigerator 58 by placing the second side 24 of the static-cling film 20 against the refrigerator 58. The static charge held by the second side 24 holds the sticker assembly 56 to the refrigerator. FIG. 13 shows a cross-section of the static-cling sticker assembly 56 adhered to the refrigerator 58 showing the static-cling film 20 acting as an intermediary.

Figure 14:
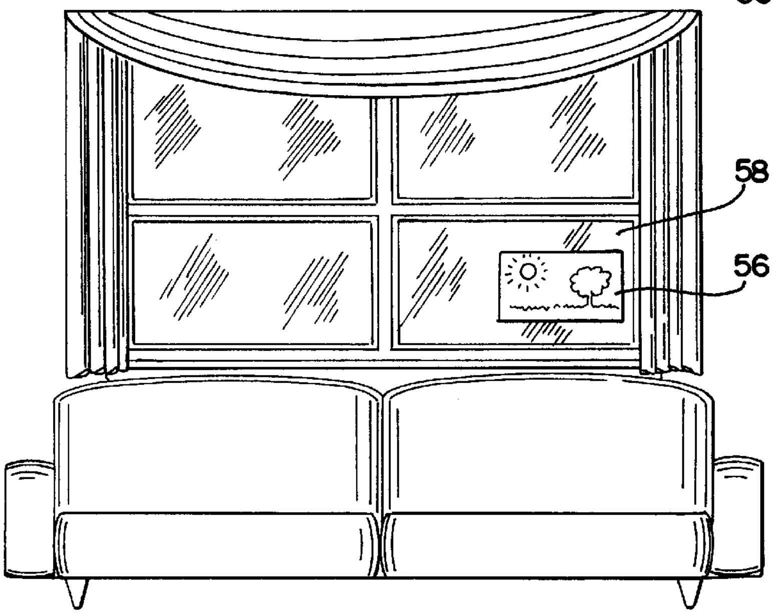

With the static-cling intermediary 20, children can place stickers on home appliances, for example, without damaging the surfaces of the appliances. The stickers can be easily removed by peeling off the static-cling film 20 from the surface 58 and reapplied to any receiving surface. Besides the home appliances, many other receiving surfaces 58 are possible. FIG. 14 shows a static-cling intermediary used between a decorative picture and a household window. It is also contemplated that indicia can be applied directly to the first side 22 of the static-cling film 20 and the film releasably adhered to a receiving surface 58. For example, an individual consumer could paint or apply other artwork or designs directly to the first side 22 of the static-cling film 20 and the film adhered to a receiving surface 58. Thus, the landscape picture shown in FIG. 14 could be painted directly onto the transparent static-cling film 20. One could see through the film and window 58 except for the areas of the painted landscape.

It is also contemplated that large static-cling sheets 20 could be used to cover entire window surfaces such as in houses, schools, restaurants and bars. Holiday stickers or sports team stickers, for example, could be applied to the static-cling film 20. The stickers could then be easily removed by peeling off the entire sheet of static-cling film 20. Thus, small pieces of the sticker 50 or adhesive residue from the sticker 50 do not remain on the window surface requiring time-consuming cleaning efforts.

One aspect of the invention is directed to a sticker assembly having a sticker with an indicia-bearing surface and a continuous, uninterrupted layer of transparent static-cling film. Adhesive is disposed between the sticker and the film resulting in direct contact of the adhesive with the static-cling film and wherein the adhesive fixedly attaches the sticker to the static-cling film. The invention can include that the indicia-bearing surface is viewable through the receiving surface and wherein the sticker assembly is adapted to be releasably adhered to the receiving surface.

Another aspect of the invention can include adhering the static-cling sticker assembly to the receiving surface by placing the second side of the static-cling film against the receiving surface wherein the indicia on the substrate is displayed for viewing through the receiving surface.

Another aspect of the invention can include that the second side of the static-cling film is releasably adhered to the window wherein the indicia-bearing sticker is viewable through the window from outside of the vehicle.

One aspect of the invention can include a continuous, uninterrupted layer of static-cling film. The film is unperforated and does not have holes. In the present invention, a static-cling film having holes would be undesirable because it would allow adhesive to come in contact with the receiving surface. The film provides an intermediate layer to prevent adhesive from contacting the receiving surface. In addition, a continuous, uninterrupted layer of static-cling film provides maximum surface area for better adherence between the film and receiving surface. A film layer having holes would reduce this surface area. Also, having holes in the film would make the film more noticeable when viewing the sticker. A continuous, uninterrupted layer of film provides a virtually undetectable layer, which is desirable so that only the owner of the sticker assembly knows that it can be releasably adhered to a receiving surface and re-adhered is desired.

As discussed, one aspect of the invention can include an adhesive disposed between the sticker and the film resulting in direct contact of the adhesive with the static-cling film and fixedly attaching the sticker to the static-cling film. In the present invention, the sticker having an adhesive layer is directly adhered to the static-cling film thus fixedly attaching the sticker and film. As shown in FIGS. 4 and 5, the sticker and film cannot be separated or pulled apart once the sticker is adhered to the film. One could attempt to separate them, but it would result in destroying the film and the sticker and be undesirable. In the present invention, one does not want the sticker to have the ability to be separated from the film such as by the incorporation of a releasing agent that would allow such separation. The static-cling film used in the present invention does not incorporate a releasing agent such that the sticker can be removed from the film. Once adhered, the sticker and adhesive cannot be separated from the film. Furthermore, it undesirable for the sticker to be separated from the static-cling film since the sticker and film form an assembly adapted to be releasably adhered to a receiving surface. In addition, when used with a car windshield sticker, the film is subjected to varying weather conditions as well as temperature changes due to the use of car defrosters or air conditioners. It is preferably that the sticker and film not be allowed to separate due to these changing conditions.

Another aspect of the invention can include the step of "adhering the substrate to the first side of the static-cling film with a layer of adhesive wherein the adhesive layer is in direct contact with the first side of the film and wherein the adhesive is fixedly attaching the substrate to the first side of the film to form a static-cling sticker assembly.

Another aspect of the invention can include that the first side of the film is adhered directly to the adhesive layer of the window sticker wherein the adhesive layer fixedly attaches the window sticker to the first side of the static-cling film. In the present invention, it is undesirable for the sticker to be separated from the static-cling film since the sticker and film form an assembly adapted to be releasably adhered to the vehicle window. Furthermore, the sticker assembly releasably adhered to the vehicle window experiences a number of different temperature changes. The assembly is subjected to hot and cold weather conditions as well as hot and cold temperatures from the vehicle heater, defroster or air conditioner. Such conditions could adversely affect the sticker assembly. For example, the window sticker could become separated from the film if a releasing agent was used on the film, thus preventing the window sticker from being displayed properly.

Another aspect of the invention can include that the film is directly adhered to the adhesive layer of the sticker wherein the adhesive layer fixedly attaches the indicia-bearing sticker to the first side of the static-cling film and that the sticker cannot be separated from the film.

Another aspect of the invention can include the step of trimming the static-cling film thereby placing peripheral edges of the static-cling film in registry with peripheral edges of the substrate. The trimming step also helps in making the sticker assembly virtually undetectable when mounted on a receiving surface so that only its owner would know it is releasably adhered.

Another aspect of the invention can include the step of adhering the sticker to the first side of the static-cling film via the adhesive layer wherein the adhesive layer is in direct contact with the first side of the film and wherein the adhesive layer fixedly attaches the sticker to the first side of the film.

Another aspect of the invention can include trimming the static-cling film thereby placing peripheral edges of the static-cling film in registry with peripheral edges of the windshield sticker."

As discussed another aspect of the invention can be applied to different types of stickers that may not have adhesive applied to the entire indicia-bearing substrate. The invention can include, for example, that the adhesive layer on a windshield sticker comprises spaced strips of adhesive and the method further including the step of placing strips of static-cling film coinciding with the strips of adhesive. The static-cling film is comprised of strips that are positioned to correspond to the strips of adhesive. It would be undesirable to have a full layer of film in a sticker such as a temporary parking sticker having adhesive strips on the sides of the sticker because it would affect the visibility of the information shown in the sticker. It is desirable to have the static-cling film layers to comprise strips that are positioned to correspond to the adhesive strips. Also using a full layer of film would be wasteful and more costly in this particular application.

While the specific embodiments have been illustrated and described, numerous modifications come to mind without significantly departing from the spirit of the invention, and the scope of protection is only limited by the scope of the accompanying Claims.

What I claim is:

1. A static-cling sticker assembly for a vehicle having a windshield, the assembly comprising:

an indicia-bearing windshield sticker having an indicia-bearing substrate with an adhesive layer disposed on the substrate, the adhesive layer comprising a first strip of adhesive positioned along a peripheral edge of the sticker and a second strip of adhesive positioned along an opposite peripheral edge of the sticker;

a first non-perforated strip of static-cling film having a first side and a second side, the second side of the first strip of film capable of holding a static charge, the first side of the first strip of film positioned to correspond to the first strip of adhesive and adhered directly to the first strip of adhesive such that the first strip of film cannot be separated from the first strip of adhesive without destroying the first strip of film and the sticker; and a second non-perforated strip of static-cling film having a first side and a second side, the second side of the second strip of film capable of holding a static charge, the first side of the second strip of film positioned to correspond to the second strip of adhesive and adhered directly to the second strip of adhesive such that the second strip of film cannot be separated from the second strip of adhesive without destroying the second strip of film and the sticker;

wherein the second sides of the strips of static-cling film are capable of being releasably adherable to the windshield so that the indicia-bearing substrate is viewable through the windshield from outside of the vehicle, and the indicia bearing portion of the sticker does not have adhesive over that portion, and the strips are trimmed to correspond in size to the strips of adhesive.

2. The static-cling sticker assembly of claim 1 wherein the static-cling film is optically clear.

3. The static-cling sticker assembly of claim 1 wherein the static-cling film is tinted.

4. A method of releasably adhering a vehicle windshield sticker to a vehicle windshield, the method comprising:

providing an indicia-bearing windshield sticker having an adhesive layer thereon, the adhesive layer comprising a first strip of adhesive positioned along a peripheral edge of the sticker and a second strip of adhesive positioned along an opposite peripheral edge of the sticker, wherein an indicia bearing portion of the sticker does not have adhesive over that portion;

providing a first non-perforated strip of static-cling film having a first side and a second side, the second side of the first strip of film capable of holding a static charge;

trimming the first strip of static-cling film to correspond in size to the first strip of adhesive;

providing a second non-perforated strip of static cling film having a first side and a second side, the second side of the second strip of film capable of holding a static charge;

trimming the second strip of static-cling film to correspond in size to the second strip of adhesive;

positioning the first side of the first strip of film to correspond to the first strip of adhesive and adhering the first side of the first strip of film directly to the first strip of adhesive such that the first strip of film cannot be separated from the first strip of adhesive without destroying the first strip of film and the sticker; and positioning the first side of the second strip of film to correspond to the second strip of adhesive and adhering the first side of the second strip of film directly to the second strip of adhesive such that second strip of film cannot be separated from the second strip of adhesive without destroying the second strip of film and the sticker; the sticker, the first and second strips of adhesive and the first and second strips of static cling film defining a static-cling sticker assembly;

releasably adhering the static-cling sticker assembly to the windshield by placing the second sides of the strips of static-cling film against the windshield so that the indicia is viewable through the windshield and wherein the static-cling sticker assembly can be peeled off the windshield without damage to the sticker.

5. The method of claim 4 wherein the static-cling film is optically clear.

6. The method of claim 4 wherein the static-cling film is tinted.

* * * * *